(12) United States Patent
He et al.

(10) Patent No.: US 9,163,336 B2
(45) Date of Patent: Oct. 20, 2015

(54) FIBERS FORMED FROM AROMATIC POLYESTER AND POLYETHER COPOLYMER

(71) Applicant: Kimberly-Clark Worldwide, Inc., Neenah, WI (US)

(72) Inventors: Aimin He, Alpharetta, GA (US); Vasily A. Topolkaraev, Appleton, WI (US); Alan E. Wright, Woodstock, GA (US); Gregory J. Wideman, Menahsa, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 14/320,788

(22) Filed: Jul. 1, 2014

(65) Prior Publication Data

US 2014/0315462 A1    Oct. 23, 2014

Related U.S. Application Data (62) Division of application No. 12/136,090, filed on Jun. 10, 2008, now Pat. No. 8,841,386.

(51) Int. Cl.
| | |
|---|---|
| *D01F 6/62* | (2006.01) |
| *C08F 283/01* | (2006.01) |
| *C08L 67/02* | (2006.01) |
| *D04H 1/56* | (2006.01) |
| *D01F 6/66* | (2006.01) |
| *C08L 71/02* | (2006.01) |

(52) U.S. Cl.
CPC ............... *D01F 6/62* (2013.01); *C08F 283/01* (2013.01); *C08L 67/02* (2013.01); *D01F 6/66* (2013.01); *D04H 1/565* (2013.01); *C08L 71/02* (2013.01); *Y10T 442/60* (2015.04); *Y10T 442/68* (2015.04); *Y10T 442/681* (2015.04); *Y10T 442/696* (2015.04)

(58) Field of Classification Search
CPC ....... C08F 283/01; C08L 67/02; C08L 71/02; D01F 6/62; D01F 6/66; D04H 1/565; Y10T 442/60; Y10T 442/68; Y10T 442/681; Y10T 442/696
USPC .................................. 525/403, 408, 437, 449
See application file for complete search history.

(56) References Cited

U.S. PATENT DOCUMENTS

| | | |
|---|---|---|
| 3,329,557 A | 7/1967 | Magat et al. |
| 3,652,713 A | 3/1972 | Okazaki et al. |
| 3,676,245 A | 7/1972 | Helmut et al. |
| 4,205,158 A | 5/1980 | Hoeschele |
| 5,039,783 A | 8/1991 | Brunelle et al. |
| 5,053,482 A | 10/1991 | Tietz |
| 5,108,820 A | 4/1992 | Kaneko et al. |
| 5,108,827 A | 4/1992 | Gessner |
| 5,188,885 A | 2/1993 | Timmons et al. |
| 5,231,161 A | 7/1993 | Brunelle et al. |
| 5,262,460 A | 11/1993 | Suzuki et al. |
| 5,270,401 A | 12/1993 | Sham et al. |
| 5,292,783 A | 3/1994 | Buchanan et al. |
| 5,336,552 A | 8/1994 | Strack et al. |
| 5,350,624 A | 9/1994 | Georger et al. |
| 5,382,400 A | 1/1995 | Pike et al. |
| 5,407,984 A | 4/1995 | Brunelle et al. |
| 5,432,000 A | 7/1995 | Young, Sr. et al. |
| 5,446,079 A | 8/1995 | Buchanan et al. |
| 5,464,688 A | 11/1995 | Timmons et al. |
| 5,466,517 A | 11/1995 | Eschwey et al. |
| 5,527,976 A | 6/1996 | Takekoshi et al. |
| 5,554,657 A | 9/1996 | Brownscombe et al. |
| 5,559,171 A | 9/1996 | Buchanan et al. |
| 5,580,911 A | 12/1996 | Buchanan et al. |

(Continued)

FOREIGN PATENT DOCUMENTS

| | | |
|---|---|---|
| EP | 0 731 198 A3 | 3/1996 |
| EP | 0 731 198 A2 | 9/1996 |

(Continued)

OTHER PUBLICATIONS

Abstract of Korean Patent No. KR1020010057068A, Jul. 4, 2001.

(Continued)

*Primary Examiner* — Robert Jones, Jr.
(74) *Attorney, Agent, or Firm* — Dority & Manning, P.A.

(57) ABSTRACT

A method for forming a fiber is provided. The method comprises supplying at least one aromatic polyester to a melt processing device and modifying the aromatic polyester with at least one polyether copolymer within the device to form a thermoplastic composition having a melt flow rate that is greater than the melt flow rate of the aromatic polyester. The polyether copolymer contains a repeating unit (A) having the following formula:

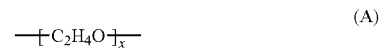

(A)

wherein,
  x is an integer from 1 to 250,
  a the polyether copolymer further containing a repeating unit (B) having the following formula:

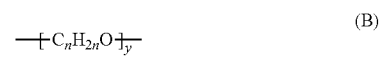

(B)

wherein,
  n is an integer from 3 to 20; and
  y is an integer from 1 to 150.

12 Claims, 1 Drawing Sheet

(56) References Cited

U.S. PATENT DOCUMENTS

| | | |
|---|---|---|
| 5,593,778 A | 1/1997 | Kondo et al. |
| 5,599,858 A | 2/1997 | Buchanan et al. |
| 5,614,298 A | 3/1997 | Tanaka et al. |
| 5,668,186 A | 9/1997 | Brunelle et al. |
| 5,688,582 A | 11/1997 | Nagaoka et al. |
| 5,753,736 A | 5/1998 | Bhat et al. |
| 5,783,505 A | 7/1998 | Duckett et al. |
| 5,817,199 A | 10/1998 | Brennecke et al. |
| 5,817,721 A | 10/1998 | Warzelhan et al. |
| 5,851,937 A | 12/1998 | Wu et al. |
| 5,895,710 A | 4/1999 | Sasse et al. |
| 5,900,322 A | 5/1999 | Buchanan et al. |
| 5,910,545 A | 6/1999 | Tsai et al. |
| 5,945,480 A | 8/1999 | Wang et al. |
| 5,952,433 A | 9/1999 | Wang et al. |
| 6,045,908 A | 4/2000 | Nakajima et al. |
| 6,063,895 A | 5/2000 | Chung et al. |
| 6,075,118 A | 6/2000 | Wang et al. |
| 6,090,494 A | 7/2000 | Rao |
| 6,177,193 B1 | 1/2001 | Tsai et al. |
| 6,194,483 B1 | 2/2001 | Tsai et al. |
| 6,197,860 B1 | 3/2001 | Tsai et al. |
| 6,201,068 B1 | 3/2001 | Tsai et al. |
| 6,218,321 B1 | 4/2001 | Lorcks et al. |
| 6,225,388 B1 | 5/2001 | Tsai et al. |
| 6,235,393 B1 | 5/2001 | Kimura et al. |
| 6,245,831 B1 | 6/2001 | Tsai et al. |
| 6,258,924 B1 | 7/2001 | Warzelhan et al. |
| 6,268,434 B1 | 7/2001 | Tsai et al. |
| 6,399,716 B2 | 6/2002 | Chung et al. |
| 6,420,027 B2 | 7/2002 | Kimura et al. |
| 6,420,048 B2 | 7/2002 | Wang |
| 6,495,656 B1 | 12/2002 | Haile et al. |
| 6,500,897 B2 | 12/2002 | Wang et al. |
| 6,506,873 B1 | 1/2003 | Ryan et al. |
| 6,525,164 B2 | 2/2003 | Faler |
| 6,544,455 B1 | 4/2003 | Tsai |
| 6,552,124 B2 | 4/2003 | Wang et al. |
| 6,552,162 B1 | 4/2003 | Wang et al. |
| 6,562,938 B2 | 5/2003 | Haile et al. |
| 6,576,576 B1 | 6/2003 | Wang et al. |
| 6,579,934 B1 | 6/2003 | Wang et al. |
| 6,607,996 B1 | 8/2003 | Matsunaga et al. |
| 6,623,853 B2 | 9/2003 | Branum et al. |
| 6,623,854 B2 | 9/2003 | Bond |
| 6,635,799 B1 | 10/2003 | Osborn, III et al. |
| 6,660,211 B2 | 12/2003 | Topolkaraev et al. |
| 6,686,303 B1 | 2/2004 | Haynes et al. |
| 6,709,526 B1 | 3/2004 | Bailey et al. |
| 6,713,595 B2 | 3/2004 | Chung et al. |
| 6,740,401 B1 | 5/2004 | Yahata et al. |
| 6,743,506 B2 | 6/2004 | Bond et al. |
| 6,756,412 B2 | 6/2004 | Muzzy |
| 6,783,854 B2 | 8/2004 | Bond |
| 6,787,493 B1 | 9/2004 | Nagaoka et al. |
| 6,802,895 B2 | 10/2004 | Mackey et al. |
| 6,811,740 B2 | 11/2004 | James et al. |
| 6,838,403 B2 | 1/2005 | Tsai et al. |
| 6,863,971 B2 | 3/2005 | Halahmi et al. |
| 6,872,674 B2 | 3/2005 | Williams et al. |
| 6,890,872 B2 | 5/2005 | Bond et al. |
| 6,890,989 B2 | 5/2005 | Wang et al. |
| 6,905,759 B2 | 6/2005 | Topolkaraev et al. |
| 6,946,195 B2 | 9/2005 | Griffith et al. |
| 6,946,506 B2 | 9/2005 | Bond et al. |
| 6,953,622 B2 | 10/2005 | Tsai et al. |
| 7,001,562 B2 | 2/2006 | Schiffer et al. |
| 7,029,620 B2 | 4/2006 | Gordon et al. |
| 7,037,983 B2 | 5/2006 | Huang et al. |
| 7,053,151 B2 | 5/2006 | Wang et al. |
| 7,060,867 B2 | 6/2006 | Jameson |
| 7,077,994 B2 | 7/2006 | Bond et al. |
| 7,101,623 B2 | 9/2006 | Jordan et al. |
| 7,153,569 B2 | 12/2006 | Kaufman et al. |
| 7,193,032 B2 | 3/2007 | Culbert et al. |
| 7,241,838 B2 | 7/2007 | Shelby et al. |
| 7,368,503 B2 | 5/2008 | Hale |
| 7,468,335 B2 | 12/2008 | Imes et al. |
| 7,972,692 B2 | 7/2011 | Chakravarty et al. |
| 7,989,062 B2 | 8/2011 | Chakravarty et al. |
| 8,470,222 B2 | 6/2013 | Shi et al. |
| 8,609,808 B2 | 12/2013 | He et al. |
| 8,710,172 B2 | 4/2014 | Wang et al. |
| 2002/0127939 A1 | 9/2002 | Hwo et al. |
| 2002/0168912 A1 | 11/2002 | Bond et al. |
| 2003/0022569 A1 | 1/2003 | Lee et al. |
| 2003/0022581 A1 | 1/2003 | Tsai et al. |
| 2003/0092343 A1 | 5/2003 | Bond et al. |
| 2003/0134915 A1 | 7/2003 | Scantlebury et al. |
| 2003/0176136 A1 | 9/2003 | Wadsworth |
| 2003/0191442 A1 | 10/2003 | Bewick-Sonntag et al. |
| 2004/0000313 A1 | 1/2004 | Gaynor et al. |
| 2004/0002273 A1 | 1/2004 | Fitting et al. |
| 2004/0053047 A1 | 3/2004 | Jackson et al. |
| 2004/0102123 A1 | 5/2004 | Bowen, Jr. et al. |
| 2004/0132873 A1 | 7/2004 | Bailey et al. |
| 2005/0054999 A1 | 3/2005 | Morman et al. |
| 2005/0112350 A1 | 5/2005 | Ning |
| 2005/0112363 A1 | 5/2005 | Ning |
| 2005/0208294 A1 | 9/2005 | Kaufman et al. |
| 2007/0082573 A1 | 4/2007 | Noda et al. |
| 2007/0219339 A1 | 9/2007 | Fregoso-Infante et al. |
| 2008/0287026 A1 | 11/2008 | Chakravarty et al. |
| 2009/0311937 A1 | 12/2009 | He et al. |

FOREIGN PATENT DOCUMENTS

| | | |
|---|---|---|
| EP | 0 905 292 A1 | 3/1999 |
| EP | 1 397 536 B1 | 3/2004 |
| EP | 1 397 537 B1 | 3/2004 |
| EP | 1 397 538 B1 | 3/2004 |
| EP | 1 397 539 B1 | 3/2004 |
| JP | 4146215 A | 5/1992 |
| JP | 6330409 A | 11/1994 |
| JP | 7109659 | 4/1995 |
| JP | 7125128 | 5/1995 |
| JP | 11043857 | 2/1999 |
| JP | 11050369 | 2/1999 |
| JP | 11117164 | 4/1999 |
| JP | 11286864 | 10/1999 |
| JP | 2001172829 A | 6/2001 |
| JP | 2003064568 | 3/2003 |
| JP | 2003193349 A | 7/2003 |
| JP | 2005048350 A | 2/2005 |
| JP | 2006307355 A | 11/2006 |
| JP | 2008019537 A | 1/2008 |
| WO | WO 9850611 A1 | 11/1998 |
| WO | WO 02090629 A1 | 11/2002 |
| WO | WO 02090630 A1 | 11/2002 |
| WO | WO 2004061172 A2 | 7/2004 |
| WO | WO 2004061172 A3 | 7/2004 |
| WO | WO 2007070064 A1 | 6/2007 |
| WO | WO 2008008067 A1 | 1/2008 |
| WO | WO 2008008068 A1 | 1/2008 |
| WO | WO 2008008074 A1 | 1/2008 |
| WO | WO 2008073099 A1 | 6/2008 |

OTHER PUBLICATIONS

Abstract of Korean Patent No. KR1020030022514A, Mar. 17, 2003.
Abstract of Korean Patent No. KR100040005193A, Jan. 16, 2004.
Abstract of Korean Patent No. KR1020040005194A, Jan. 16, 2004.
ASTM D 1117-97—*Standard Test Methods for Nonwoven Fabrics*, Mar. 10, 1997, pp. 311-313.
ASTM D 1238-04c—*Standard Test Method for Melt Flow Rates of Thermoplastics by Extrusion Plastomer*, current edition approved Dec. 1, 2004, originally approved in 1965, pp. 1-14.
ASTM D 1239-92—*Standard Test Method for Resistance of Plastic Films to Extraction by Chemicals*, current edition approved Aug. 15, 1992, pp. 281-282.
ASTM D 3418-03 (D 3417-99)—*Standard Test Method for Transition Temperatures and Enthalpies of Fusion and Crystallization of Polymers by Differential Scanning Calorimetry*, current edition approved Dec. 1, 2003, originally approved in 1975, pp. 66-72.

(56) References Cited

OTHER PUBLICATIONS

ASTM D 5034-95—*Standard Test Method for Breaking Strength and Elongation of Textile Fabrics (Grab Test)*, current edition approved May 15, 1995, pp. 674-681.

ASTM D 5338-92—*Standard Test Method for Determing Aerobic Biodegradation of Plastic Materials Under Controlled Composting Conditions*, current edition approved Dec. 15, 1992, pp. 456-461.

ASTM D 7191-05—*Standard Test Method for Determination of Moisture in Plastics by Relative Humidity Sensor*, current edition approved Nov. 1, 2005, pp. 1-4.

Article—*Biodegradation of aliphatic-aromatic copolyesters: evaluation of the final biodegradability and ecotoxicological impact of degradation intermediates*, Witt et al., Chemosphere 44, 2001, pp. 289-299.

Article—*Block Polymer Nonionic Surfactants in Textile*, Irving R. Schmolka, JAOCS, vol. 59, No. 7, Jul. 1982, pp. 322-327.

Article—*Rheological Properties of Poly(lactides). Effect of Molecular Weight and Temperature on the Viscoelasticity of Poly(l-lactic acid)*. Cooper-White et al., Journal of Polymer Science: Part B: Polymer Physics, vol. 37, 1999, pp. 1803-1814.

Article—*Synthesis of Oligoester $\alpha,\omega$-diois by Alcoholysis of PET through the Reactive Extrusion Process*, Dannoux et al., The Canadian Journal of Chemical Engineering, vol. 80, Dec. 2002, pp. 1075-1082.

Machine Translation of JP 2008019537, Jan. 31, 2008, 28 pages.

Product Information on Ecoflex® from BASF—The Chemical Company, Sep. 22, 2005, 4 pages.

Product Information from Ingeo and NatureWorks®—PLA Polymer 6201D, 6202D, and 6302D, 2005, 11 pages.

Technical Bulletin for Pluronic® Block Copolymer Surfactant from BASF Corporation, 2004, 1 pages.

Search Report and Written Opinion for PCT/IB2009/051572 dated Jan. 14, 2010, 12 pages.

FIBERS FORMED FROM AROMATIC POLYESTER AND POLYETHER COPOLYMER

RELATED APPLICATIONS

The present application is a divisional of U.S. application Ser. No. 12/136,090 having a filing date of Jun. 10, 2008, the entire contents of which are incorporated herein by reference.

BACKGROUND OF THE INVENTION

Aromatic polyesters, such as polyethylene terephthalate (PET), polytrimethylene terephthalate (PTT), and polybutylene terephthalate (PBT), are widely used in fiber forming applications. However, attempts to form nonwoven webs from aromatic polyesters have been hindered due to their relatively high melting points, low bond flexibility, and high roughness due to the high glass transition temperature and slow crystallization rate of such polymers. Other polyesters, such as polybutylene succinate (PBS), polybutylene adipate terephthalate (PBAT) and polycaprolactone (PCL), have a low glass transition temperature and softness characteristic similar to polyethylene. However, these polymers typically possess a small bonding window, which leads to difficulty in forming a nonwoven web from such polymers at high speeds. As such, a need currently exists for aromatic polyester compositions that exhibit good mechanical and physical properties, but which may be readily formed into fibers and nonwoven webs.

SUMMARY OF THE INVENTION

In accordance with one embodiment of the present invention, a method for forming a fiber is disclosed. The method comprises supplying at least one aromatic polyester to a melt processing device and modifying the aromatic polyester with at least one polyether copolymer within the device to form a thermoplastic composition having a melt flow rate that is greater than the melt flow rate of the aromatic polyester. The polyether copolymer contains a repeating unit (A) having the following formula:

(A)

wherein,
x is an integer from 1 to 250,
the polyether copolymer further containing a repeating unit (B) having the following formula:

(B)

wherein,
n is an integer from 3 to 20; and
y is an integer from 1 to 150.

In accordance with another embodiment of the present invention, a fiber for use in forming a nonwoven web is disclosed. The fiber is formed from a thermoplastic composition comprising at least one aromatic polyester in an amount from about 75 wt. % to about 99 wt. % and at least one polyether copolymer in an amount from about 1 wt. % to about 25 wt. %, wherein the polyether copolymer contains from about 40 mol. % to about 95 mol. % of a repeating unit (A) and from about 5 mol. % to about 60 mol. % of a repeating unit (B), such as described above.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which.

Repeat use of references characters in the present specification and drawing is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

DEFINITIONS

As used herein, the term "fibers" refer to elongated extrudates formed by passing a polymer through a forming orifice such as a die. Unless noted otherwise, the term "fibers" includes discontinuous fibers having a definite length and substantially continuous filaments. Substantially filaments may, for instance, have a length much greater than their diameter, such as a length to diameter ratio ("aspect ratio") greater than about 15,000 to 1, and in some cases, greater than about 50,000 to 1.

As used herein, the term "monocomponent" refers to fibers formed one polymer. Of course, this does not exclude fibers to which additives have been added for color, anti-static properties, lubrication, hydrophilicity, liquid repellency, etc.

As used herein, the term "multicomponent" refers to fibers formed from at least two polymers (e.g., bicomponent fibers) that are extruded from separate extruders. The polymers are arranged in substantially constantly positioned distinct zones across the cross-section of the fibers. The components may be arranged in any desired configuration, such as sheath-core, side-by-side, pie, island-in-the-sea, and so forth. Various methods for forming multicomponent fibers are described in U.S. Pat. No. 4,789,592 to Taniguchi et al. and U.S. Pat. No. 5,336,552 to Strack et al., U.S. Pat. No. 5,108,820 to Kaneko, et al., U.S. Pat. No. 4,795,668 to Kruege, et al., 5,382,400 to Pike, et al., U.S. Pat. No. 5,336,552 to Strack, et al., and U.S. Pat. No. 6,200,669 to Marmon, et al., which are incorporated herein in their entirety by reference thereto for all purposes. Multicomponent fibers having various irregular shapes may also be formed, such as described in U.S. Pat. No. 5,277,976 to Hogle, et al., U.S. Pat. No. 5,162,074 to Hills, U.S. Pat. No. 5,466,410 to Hills, U.S. Pat. No. 5,069,970 to Largman, et al., and U.S. Pat. No. 5,057,368 to Largman, et al., which are incorporated herein in their entirety by reference thereto for all purposes.

As used herein, the term "multiconstituent" refers to fibers formed from at least two polymers (e.g., biconstituent fibers) that are extruded from the same extruder. The polymers are not arranged in substantially constantly positioned distinct zones across the cross-section of the fibers. Various multiconstituent fibers are described in U.S. Pat. No. 5,108,827 to Gessner, which is incorporated herein in its entirety by reference thereto for all purposes.

As used herein, the term "nonwoven web" refers to a web having a structure of individual fibers that are randomly interlaid, not in an identifiable manner as in a knitted fabric. Nonwoven webs include, for example, meltblown webs, spunbond webs, carded webs, wet-laid webs, airlaid webs, coform webs, hydraulically entangled webs, etc. The basis weight of the nonwoven web may generally vary, but is typically from about 5 grams per square meter ("gsm") to 200 gsm, in some embodiments from about 10 gsm to about 150 gsm, and in some embodiments, from about 15 gsm to about 100 gsm.

As used herein, the term "meltblown" web or layer generally refers to a nonwoven web that is formed by a process in which a molten thermoplastic material is extruded through a plurality of fine, usually circular, die capillaries as molten fibers into converging high velocity gas (e.g., air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al.; U.S. Pat. No. 4,307,143 to Meitner, et al.; and U.S. Pat. No. 4,707,398 to Wisneski, et al., which are incorporated herein in their entirety by reference thereto for all purposes. Meltblown fibers may be substantially continuous or discontinuous, and are generally tacky when deposited onto a collecting surface.

As used herein, the term "spunbond" web or layer generally refers to a nonwoven web containing small diameter substantially continuous filaments. The filaments are formed by extruding a molten thermoplastic material from a plurality of fine, usually circular, capillaries of a spinnerette with the diameter of the extruded filaments then being rapidly reduced as by, for example, eductive drawing and/or other well-known spunbonding mechanisms. The production of spunbond webs is described and illustrated, for example, in U.S. Pat. No. 4,340,563 to Appel, et al., U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S. Pat. No. 3,542,615 to Dobo, et al., and U.S. Pat. No. 5,382,400 to Pike, et al., which are incorporated herein in their entirety by reference thereto for all purposes. Spunbond filaments are generally not tacky when they are deposited onto a collecting surface. Spunbond filaments may sometimes have diameters less than about 40 micrometers, and are often between about 5 to about 20 micrometers.

As used herein, the term "coform web" generally refers to a composite material containing a mixture or stabilized matrix of thermoplastic fibers and a second non-thermoplastic material. As an example, coform materials may be made by a process in which at least one meltblown die head is arranged near a chute through which other materials are added to the web while it is forming. Such other materials may include, but are not limited to, fibrous organic materials such as woody or non-woody pulp such as cotton, rayon, recycled paper, pulp fluff and also superabsorbent particles, inorganic and/or organic absorbent materials, treated polymeric staple fibers and so forth. Some examples of such coform materials are disclosed in U.S. Pat. No. 4,100,324 to Anderson, et al.; U.S. Pat. No. 5,284,703 to Everhart, et al.; and U.S. Pat. No. 5,350,624 to Georger, et al.; which are incorporated herein in their entirety by reference thereto for all purposes.

DETAILED DESCRIPTION

Generally speaking, the present invention is directed to a method for forming fibers from a thermoplastic composition. More specifically, the method involves supplying an aromatic polyester to an extruder and modifying the polyester within the extruder with a polyether copolymer. The polyether copolymer has been found to improve a variety of characteristics of the thermoplastic composition, including its ability to be melt processed into fibers and webs, as well as its sensitivity to moisture. The relative amount of the polyether copolymer and aromatic polyester in the thermoplastic composition is selectively controlled to achieve a desired balance between softness and the mechanical properties of the resulting fibers and webs. For example, the aromatic polyester(s) may constitute from about 75 wt. % to about 99 wt. %, in some embodiments from about 80 wt. % to about 98 wt. %, and in some embodiments, from about 85 wt. % to about 95 wt. % of the thermoplastic composition. Likewise, the polyether copolymer(s) may constitute from about 1 wt. % to about 25 wt. %, in some embodiments from about 2 wt. % to about 20 wt. %, and in some embodiments, from about 5 wt. % to about 15 wt. % of the thermoplastic composition. Various embodiments of the present invention will now be described in more detail below.

I. Thermoplastic Composition

A. Aromatic Polyester

Aromatic polyesters may be employed in the present invention that are amorphous, crystalline, or semi-crystalline (containing amorphous and crystalline domains). The polyesters may include newly produced resins ("virgin" resins) and/or "recycled" resins, such as those derived from molded articles (e.g., beverage bottles, containers, etc.), films, and so forth.

Generally speaking, aromatic polyesters may be synthesized from the polymerization of a polyol with a carboxylic acid or anhydride thereof. The carboxylic acid monomer constituents of the polyester may be predominantly aromatic in nature in that they lack aliphatic chains. For example, at least about 80 mol. %, in some embodiments at least about 90 mol. %, and in some embodiments, at least about 95 mol. % of the carboxylic acid monomer constituents may be aromatic monomers. In one particular embodiment, the carboxylic acid monomer constituents are formed from aromatic dicarboxylic acids (or anhydrides thereof). Representative aromatic dicarboxylic acids that may be used include substituted and unsubstituted, linear or branched, aromatic dicarboxylic acids selected from aromatic dicarboxylic acids containing 1 to about 6 carbon atoms, and derivatives thereof. Non-limiting examples of aromatic dicarboxylic acids include terephthalic acid, isophthalic acid, napthalic acid, 1,4-naphthalene dicarboxylic acid, 2,7-naphthalenedicarboxylic acid, 3,4'-diphenyl ether dicarboxylic acid, 4,4'-diphenyl ether dicarboxylic acid, 3,4'-diphenyl sulfide dicarboxylic acid, 4,4'- diphenyl sulfide dicarboxylic acid, 3,4'-diphenyl sulfone dicarboxylic acid, 4,4'-diphenyl sulfone dicarboxylic acid, 3,4'-benzophenonedicarboxylic acid, etc., as well as alkyl derivatives of such acids, such as dimethyl terephthalate, dimethyl isophthalate, dimethyl-2,6-naphthalate, dimethyl-2,7-naphthalate, dimethyl-3,4'diphenyl ether dicarboxylate, dimethyl-4,4'-diphenyl ether dicarboxylate, dimethyl-3,4'-diphenyl sulfide dicarboxylate, dimethyl-4,4'-diphenyl sulfide dicarboxylate, dimethyl-3,4'-diphenyl sulfone dicarboxylate, dimethyl-4,4'-diphenyl sulfone dicarboxylate, dimethyl-3,4'-benzophenonedicarboxylate, dimethyl-4,4'-benzophenonedicarboxylate, dimethyl-1,4-naphthalate, mixtures thereof, etc.

Suitable polyols used to form the aromatic polyester may be substituted or unsubstituted, linear or branched, polyols selected from polyols containing 2 to about 12 carbon atoms and polyalkylene ether glycols containing 2 to 8 carbon atoms. Examples of polyols that may be used include, but are not limited to, ethylene glycol, diethylene glycol, propylene glycol, 1,2-propanediol, 1,3-propanediol, 2,2-dimethyl-1,3-propanediol, 1,2-butanediol, 1,3-butanediol, 1,4-butanediol, 1,2-pentanediol, 1,5-pentanediol, 1,6-hexanediol, polyethylene glycol, diethylene glycol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, cyclopentanediol, triethylene glycol, and tetraethylene Preferred polyols include 1,4-butanediol; 1,3-propanediol; ethylene glycol; 1,6-hexanediol; diethylene glycol; and 1,4-cyclohexanedimethanol.

The polymerization may be catalyzed by a catalyst, such as a titanium-based catalyst (e.g., tetraisopropyltitanate, tetraisopropoxy titanium, dibutoxydiacetoacetoxy titanium, or tetrabutyltitanate). If desired, a diisocyanate chain extender may be reacted with the polyester to increase its molecular weight. Representative diisocyanates may include toluene 2,4-diisocyanate, toluene 2,6-diisocyanate, 2,4'-diphenylmethane diisocyanate, naphthylene-1,5-diisocyanate, xylylene diisocyanate, hexamethylene diisocyanate ("HMDI"), isophorone diisocyanate and methylenebis(2-isocyanatocyclohexane). Trifunctional isocyanate compounds may also be employed that contain isocyanurate and/or biurea groups with a functionality of not less than three, or to replace the diisocyanate compounds partially by tri-or polyisocyanates. The preferred diisocyanate is hexamethylene diisocyanate. The amount of the chain extender employed is typically from about 0.3 to about 3.5 wt. %, in some embodiments, from about 0.5 to about 2.5 wt. % based on the total weight percent of the polymer.

The polyester may either be a linear polymer or a long-chain branched polymer. Long-chain branched polymers are generally prepared by using a low molecular weight branching agent, such as a polyol, polycarboxylic acid, hydroxy acid, and so forth. Representative low molecular weight polyols that may be employed as branching agents include glycerol, trimethylolpropane, trimethylolethane, polyethertriols, glycerol, 1,2,4-butanetriol, pentaerythritol, 1,2,6-hexanetriol, sorbitol, 1,1,4,4,-tetrakis (hydroxymethyl) cyclohexane, tris(2-hydroxyethyl) isocyanurate, and dipentaerythritol. Representative higher molecular weight polyols (molecular weight of 400 to 3000) that may be used as branching agents include triols derived by condensing alkylene oxides having 2 to 3 carbons, such as ethylene oxide and propylene oxide with polyol initiators. Representative polycarboxylic acids that may be used as branching agents include hemimellitic acid, trimellitic (1,2,4-benzenetricarboxylic) acid and anhydride, trimesic (1,3,5-benzenetricarboxylic) acid, pyromellitic acid and anhydride, benzenetetracarboxylic acid, benzophenone tetracarboxylic acid, 1,1,2,2-ethane-tetracarboxylic acid, 1,1, 2-ethanetricarboxylic acid, 1,3,5-pentanetricarboxylic acid, and 1,2,3,4-cyclopentanetetracarboxylic acid. Representative hydroxy acids that may be used as branching agents include malic acid, citric acid, tartaric acid, 3-hydroxyglutaric acid, mucic acid, trihydroxyglutaric acid, 4-carboxyphthalic anhydride, hydroxyisophthalic acid, and 4-(β-hydroxyethyl)phthalic acid. Such hydroxy acids contain a combination of 3 or more hydroxyl and carboxyl groups. Especially preferred branching agents include trimellitic acid, trimesic acid, pentaerythritol, trimethylol propane and 1,2,4-butanetriol.

In one particular embodiment, the aromatic polyester has the following general structure:

wherein, p is an integer from 2 to 10, in some embodiments from 2 to 4, and in one embodiment, 2; and r is an integer greater than 1. Although the polymer referenced above is formed from a terephthalic acid monomer, it should be understood that it may also contain minor amounts of other aromatic monomers, such as other isophthalic acid, phthalic acid, and so forth. Specific examples of such aromatic polyesters include poly(ethylene terephthalate) ("PET"), poly(propylene terephthalate) ("PPT"), poly(butylene terephthlate) ("PBT"), PET modified with cyclohexanedimethanol (CHDM), etc. Such polymers are available, for instance, from DuPont under the designation CRYSTAR® and from Eastman Kodak under the designation EASTAR® or EASTPAK®. Still other suitable aromatic polyesters include PET modified with cyclohexanedimethanol ("CHDM"), PCTA copolymers (a polymer of CHDM and terephthalic acid with another acid substituted for a portion of the terephthalic acid, such as isophthalic acid), poly(ethylene naphthalate) ("PEN"), poly(propylene naphthalate) ("PPN"), poly(butylene naphthlate) ("PBN"), etc. Further, degradable terephthalate biopolymers may also be employed, such as those that contain alternating terephthalate and aliphatic units derived from one or more dials having from 2 to about 5 carbons (e.g., 1,4-butanediol, 1,3-propanediol, etc.). Examples of such biopolymers include for instance, BIOMAX® PTT (polytrimethylterephthalate) and SORONA®, both of which are available from DuPont.

B. Polyether Copolymer

The polyether copolymer employed in the thermoplastic composition contains a repeating unit (A) having the following formula:

wherein, x is an integer from 1 to 250, in some embodiments from 2 to 200, and in some embodiments, from 4 to 150. The polyether copolymer also contains a repeating unit (B) having the following formula:

wherein, n is an integer from 3 to 20, in some embodiments from 3 to 10, and in some embodiments, from 3 to 6; and y is an integer from 1 to 150, in some embodiments from 2 to 125, and in some embodiments, from 4 to 100. Specific examples of monomers for use in forming the repeating unit (B) may include, for instance, 1,2-propanediol ("propylene glycol"); 1,3-propanediol ("trimethylene glycol"); 1,4-butanediol ("tetramethylene glycol"); 2,3-butanediol ("dimethylene glycol"); 1,5-pentanediol; 1,6-hexanediol; 1,9-nonanediol; 2-methyl-1,3-propanediol; neopentyl glycol; 2-methyl-1,4-butanediol; 3-methyl-1,5-pentanediol; 3-oxa-1,5-pentanediol ("diethylene glycol"); spiro-glycols, such as 3,9-bis(1,1-dimethyl-2-hydroxyethyl)-2,4,8,10-tetraoxaspiro [5,5] undecane and 3,9-diethano1-2,4,8,10-tetraoxaspiro [5,5] undecane; and so forth. Among these polyols, propylene glycol, dimethylene glycol, trimethylene glycol, and tetramethylene glycol are particularly suitable for use in the present invention.

The present inventors have discovered that an appropriate balance between the content of the repeating units (A) and (B), as well as their respective molecular weights, may result in a copolymer having optimal properties for facilitating the formation of nonwoven webs from aromatic polyesters. The repeating unit (A) of the polyether copolymer, for instance, helps reduce the glass transition temperature of the aromatic polyester, thereby improving its ability to be processed into a web of sufficient strength and elongation properties. The repeating unit (A) is, however, generally semi-crystalline in nature and thus may gradually crystallize during and after melt processing, which increases the brittleness of webs formed therefrom. Further, the repeating unit (A) is also relatively hydrophilic in nature and thus soluble in water, which may result in phase separation of the polymer when exposed to conditions of high humidity. The repeating unit (B) of the polyether copolymer of the present invention helps counteract the crystallanity/moisture-sensitivity of the repeating unit (A). That is, the repeating unit (B) is generally amorphous and is unlikely to crystallize during melt processing. Owing to its longer carbon chain, the repeating unit (B) is also relatively insoluble in water and thus less sensitive to moisture.

In this regard, the repeating unit (A) of the copolymer typically constitutes from about 40 mol. % to about 95 mol. %, in some embodiments from about 50 mol. % to about 90 mol. %, and in some embodiments, from about 60 mol. % to about 85 mol. % of the polyether copolymer. Likewise, the repeating unit (B) typically constitutes from about 5 mol. % to about 60 mol. %, in some embodiments from about 10 mol. % to about 50 mol. %, and in some embodiments, from about 15 mol. % to about 40 mol. % of the polyether copolymer. The number average molecular weight of the repeating unit (A) may range from about 500 to about 10,000, in some embodiments from about 750 to about 8,000, and in some embodiments, from about 1,000 to about 5,000. The number average molecular weight of the repeating unit (B) may likewise range from about 100 to about 2,000, in some embodiments from about 200 to about 1,500, and in some embodiments, from about 400 to about 1,000. The number average molecular weight of the entire copolymer may also range from about 600 to about 10,000, in some embodiments from about 1,000 to about 8,000, and in some embodiments, from about 1,250 to about 5,000.

Of course, it should be understood that other repeating units or constituents may also be present in the copolymer. For instance, the copolymer may contain another repeating unit (C) that is different than the repeating units (A) and/or (B), yet selected from one or more of the monomers references above. As an example, the repeating unit (A) may have the structure described above, the repeating unit (B) may be formed from 1,2-propanediol ("propylene glycol") and the repeating unit (C) may be formed from 1,4-butanediol ("tetramethylene glycol").

The polyether copolymer may possess any desired configuration, such as block (diblock, triblock, tetrablock, etc.), random, alternating, graft, star, etc. The repeating units (A) and (B) of the polyether copolymer may likewise be distributed in any desired fashion throughout the polymer. In one embodiment, for example, the polyether copolymer has the following general structure:

wherein, x is an integer from 1 to 250, in some embodiments from 2 to 200, and in some embodiments, from 4 to 150;

y is an integer from 1 to 150, in some embodiments from 2 to 125, and in some embodiments, from 4 to 100;

z is an integer from 0 to 200, in some embodiments from 2 to 125, and in some embodiments from 4 to 100;

n is an integer from 3 to 20, in some embodiments from 3 to 10, and in some embodiments, from 3 to 6;

A is hydrogen, an alkyl group, an acyl group, or an aryl group of 1 to 10 carbon atoms, and

B is hydrogen, an alkyl group, an acyl group, or an aryl group of 1 to 10 carbon atoms. When "z" is greater than 0, for example, the copolymer has an "ABA" configuration and may include, for instance, polyoxyethylene/polyoxypropylene polyoxyethylene copolymers (EO/PO/EO) such as described in U.S. Patent Application Publication No. 2003/0204180 to Huang, et al., which is incorporated herein in its entirety by reference thereto for all purposes. Suitable EO/PO/EO polymers for use in the present invention are commercially available under the trade name PLURONIC® (e.g., F-68, F-127 L-122, L-92, L-81, and L-61) from BASF Corporation, Mount Olive, N.J.

The polyether copolymer may be formed using any known polymerization technique as is known in the art. For example, the monomers may be simultaneously reacted to form the copolymer. Alternatively, monomers may be separately reacted to form prepolymers, which are then copolymerized with monomers and/or other prepolymers. A catalyst may optionally be employed to facilitate the copolymerization reaction. Suitable reaction catalysts may include, for instance, tin catalysts, such as tin octylate, tin stearate, dibutyltin dioctoate, dibutyltin dioleylmaleate, dibutyltin dibutylmaleate, dibutyltin dilaurate, 1,1,3,3-tetrabutyl-1,3-dilauryloxycarbonyldistannoxane, dibutyltindiacetate, dibutyltin diacetylacetonate, dibutyltin bis(o-phenylphenoxide), dibutyltin oxide, dibutyltin bis(triethoxysilicate), dibutyltin distearate, dibutyltin bis(isononyl-3-mercaptopropionate), dibutyltin bis(isooctyl thioglycolate), dioctyltin oxide, dioctyltin dilaurate, dioctyltin diacetate, and dioctyltin diversatate; and tertiary amine compounds and their analogues, such as triethylamine, triphenylamine, trimethylamine, N,N-dimethylaniline, and pyridine. Other suitable polymerization catalysts include titanium-based catalysts, such as tetraisopropyltitanate, tetraisopropoxy titanium, dibutoxydiacetoacetoxy titanium, or tetrabutyltitanate. The amount of the catalyst added in the reaction is not particularly limited, but may range from about 0.0001 to about 3 parts by weight, based on 100 parts by weight of the copolymer.

C. Nucleating Agents

A beneficial aspect of the present invention is that suitable crystallization properties of the thermoplastic composition may be provided without the need for conventional nucleating agents. Nevertheless, a nucleating agent may be employed if desired to improve processing and to facilitate crystallization during quenching. Suitable nucleating agents for use in the present invention may include, for instance, inorganic acids, carbonates (e.g., calcium carbonate or magnesium carbonate), oxides (e.g., titanium oxide, silica, or alumina), nitrides (e.g., boron nitride), sulfates (e.g., barium sulfate), silicates (e.g., calcium silicate), stearates, benzoates, carbon black, graphite, and so forth. Still another suitable nucleating agent that may be employed is a "macrocyclic ester oligomer", which generally refers to a molecule with one or more identifiable structural repeat units having an ester functionality and a cyclic molecule of 5 or more atoms, and in some cases, 8 or more atoms covalently connected to form a ring. The ester oligomer generally contains 2 or more identifiable ester functional repeat units of the same or different formula. The oligomer may include multiple molecules of different formulae having varying numbers of the same or different structural repeat units, and may be a co-ester oligomer or multi-ester oligomer (i.e., an oligomer having two or more different structural repeat units having an ester functionality within one cyclic molecule). Particularly suitable macrocyclic ester oligomers for use in the present invention are macrocyclic poly(alkylene dicarboxylate) oligomers having a structural repeat unit of the formula:

wherein, $R^1$ is an alkylene, cycloalkylene, or a mono- or polyoxyalkylene group, such as those containing a straight chain of about 2-8 atoms; and A is a divalent aromatic or alicyclic group.

Specific examples of such ester oligomers may include macrocyclic poly(1,4-butylene terephthalate), macrocyclic poly(ethylene terephthalate), macrocyclic poly(1,3-propylene terephthalate), macrocyclic poly(1.4-butylene isophthalate), macrocyclic poly(1,4-cyclohexylenedimethylene terephthalate), macrocyclic poly(1,2-ethylene 2,6-naphthalenedicarboxylate) oligomers, co-ester oligomers comprising two or more of the above monomer repeat units, and so forth. Macrocyclic ester oligomers may be prepared by known methods, such as described in U.S. Pat. Nos. 5,039,783; 5,231,161; 5,407,984; 5,527,976; 5,668,186; 6,420,048; 6,525,164; and 6,787,632. Alternatively, macrocyclic ester oligomers that may be used in the present invention are commercially available. One specific example of a suitable macrocyclic ester oligomer is macrocyclic poly(1,4-butylene terephthalate), which is commercially available from Cyclics Corporation under the designation CBT® 100.

The amount of nucleating agents may be selectively controlled to achieve the desired properties for the fibers. For example, nucleating agents may be present in an amount of about 0.1 wt. % to about 25 wt. %, in some embodiments from about 0.2 wt. % to about 15 wt. %, in some embodiments from about 0.5 wt. % to about 10 wt. %, and in some embodiments, from about 1 wt. % to about 5 wt. %, based on the dry weight of the thermoplastic composition.

D. Other Components

Other components may of course be utilized for a variety of different reasons. For instance, water may be employed in the present invention. Under appropriate conditions, water is also capable of hydrolytically degrading the aromatic polyester and/or polyether copolymer and thus reducing their molecular weight. The hydroxyl groups of water are believed to attack the ester linkages of the aromatic polyester, for example, thereby causing chain scission or "depolymerization" of the ester molecule into one or more shorter ester chains. The shorter chains may include aromatic polyesters, as well as minor portions of ester monomers or oligomers, and combinations of any of the foregoing. The amount of water employed relative to the thermoplastic composition affects the extent to which the hydrolysis reaction is able to proceed. However, if the water content is too great, the natural saturation level of the polymer may be exceeded, which may adversely affect resin melt properties and the physical properties of the resulting fibers. Thus, in most embodiments of the present invention, the water content is from about 0 to about 5000 parts per million ("ppm"), in some embodiments from about 20 to about 4000 ppm, and in some embodiments, from about 50 to about 2000, and in some embodiments, from about 100 to about 1000 ppm, based on the dry weight of the starting polymers used in the thermoplastic composition. The water content may be determined in a variety of ways as is known in the art, such as in accordance with ASTM D 7191-05, such as described in more detail below.

The technique employed to achieve the desired water content is not critical to the present invention. In fact, any of a variety of well known techniques for controlling water content may be employed, such as described in U.S. Patent Application Publication Nos. 2005/0004341 to Culbert, et al. and 2001/0003874 to Gillette, et al., which are incorporated herein in their entirety by reference thereto for all purposes. For example, the water content of the starting polymer may be controlled by selecting certain storage conditions, drying conditions, the conditions of humidification, etc. In one embodiment, for example, the aromatic polyester and/or polyether copolymer may be humidified to the desired water content by contacting pellets of the polymer(s) with an aqueous medium (e.g., liquid or gas) at a specific temperature and for a specific period of time. This enables a targeted water diffusion into the polymer structure (moistening). For example, the polymer may be stored in a package or vessel containing humidified air. Further, the extent of drying of the polymer during manufacture of the polymer may also be controlled so that the thermoplastic composition has the desired water content. In still other embodiments, water may be added during melt processing as described herein. Thus, the term "water content" is meant to include the combination of any residual moisture (e.g., the amount of water present due to conditioning, drying, storage, etc.) and also any water specifically added during melt processing.

Still other materials that may be used include, without limitation, wetting agents, melt stabilizers, processing stabilizers, heat stabilizers, light stabilizers, antioxidants, pigments, surfactants, waxes, flow promoters, particulates, and other materials added to enhance processability.

II. Melt Processing

The melt processing of the thermoplastic composition and any optional additional components may be performed using any of a variety of known techniques. In one embodiment, for example, the raw materials (e.g., aromatic polyester, polyether copolymer, etc.) may be supplied separately or in combination to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. One particularly suitable melt processing device is a co-rotating, twin-screw extruder (e.g., ZSK-30 twin-screw extruder available from Werner & Pfleiderer Corporation of Ramsey, N.J.). Such extruders may include feeding and venting ports and provide high intensity distributive and dispersive mixing. For example, the aromatic polyester and polyether copolymer may be fed to the same or different feeding ports of the twin-screw extruder and melt blended to form a substantially homogeneous melted mixture. If desired, water or other additives (e.g., organic chemicals) may be thereafter injected into the polymer melt and/or separately fed into the extruder at a different point along its length. Alternatively, one or more of the polymers may simply be supplied in a pre-humidified state.

Regardless of the particular melt processing technique chosen, the raw materials may be blended under high shear/pressure and heat to ensure sufficient dispersion. For example, melt processing may occur at a temperature of from about 150° C. to about 350° C., in some embodiments from about 200° C. to about 300° C., and in some embodiments, from about 240° C. to about 290° C. Likewise, the apparent shear rate during melt processing may range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows. Of course, other variables, such as the residence time during melt processing, which is inversely proportional to throughput rate, may also be controlled to achieve the desired degree of homogeneity.

As a result of the modification by the polyether copolymer, the thermoplastic composition may exhibit improved processability due to a higher melt flow rate than the aromatic polyester alone. Thus, when processed in equipment lower power settings can be utilized, such as using less torque to turn the screw of the extruder. The melt flow rate may be increased so that the ratio of the thermoplastic composition melt flow rate to the starting aromatic polyester melt flow rate (on a dry basis) is at least about 1.5, in some embodiments at least about 5, in some embodiments at least about 10, and in some embodiments, from about 30 to about 100. In one particular embodiment, the thermoplastic composition may have a melt flow rate (dry basis) of from about 50 to about 1000 grams per 10 minutes, in some embodiments from about 100 to about 800 grams per 10 minutes, and in some embodiments, from about 150 to about 400 grams per 10 minutes (determined at 270° C., 2.16 kg). Likewise, the apparent viscosity may for instance, be reduced so that the ratio of aromatic polyester viscosity to the thermoplastic composition viscosity is at least about 1.1, in some embodiments at least about 2, and in some embodiments, from about 15 to about 100. Of course, the apparent viscosity, melt flow rate, etc. may vary depending on the intended application.

In addition, the thermoplastic composition may also exhibit a lower glass transition temperature than the aromatic polyester alone. For instance, the thermoplastic composition may have a glass transition temperature that is at least about 5° C., in some embodiments at least about 10° C., and in some embodiments, at least about 15° C. less than the glass transition temperature of aromatic polyester. For example, the thermoplastic composition may have a $T_g$ of less than about 75° C., in some embodiments from about 5° C. to about 70° C., in some embodiments from about 10° C. to about 65° C., and in some embodiments, from about 20° C. to about 60° C. On the other hand, aromatic polyesters, such as polyethylene terephthalate, typically have a $T_g$ of from about 70° C. to about 80° C. The melting point of the thermoplastic composition may also range from about 150° C. to about 350° C., in some embodiments from about 200° C. to about 300° C., and in some embodiments, from about 240° C. to about 290° C.

The thermoplastic composition may also crystallize at a higher temperature and at a faster crystallization rate than the aromatic polyester alone, which may allow the thermoplastic composition to be more readily processed. The crystallization temperature may, for instance, be increased so that the ratio of the thermoplastic composition crystallization temperature to the aromatic polyester crystallization temperature is greater than 1, in some embodiments at about 1.2 or more, and in some embodiments, about 1.5 or more. For example, the crystallization temperature of the thermoplastic composition may range from about 100° C. to about 300° C., in some embodiments from about 125° C. to about 275° C., and in some embodiments, from about 180° C. to about 250° C. Likewise, the ratio of the crystallization rate during the first cooling cycle (expressed in terms of the latent heat of crystallization, $\Delta H_C$) of the thermoplastic composition to the crystallization rate of the aromatic polyester is greater than 1, in some embodiments about 2 or more, and in some embodiments, about 3 or more. For example, the thermoplastic composition may possess a latent heat of crystallization ($\Delta H_c$) during the first cooling cycle of about 10 J/g or more, in some embodiments about 20 J/g or more, and in some embodiments, about 30 J/g or more. The thermoplastic composition may also have a latent heat of fusion ($\Delta H_f$) during the second heating cycle of about 15 Joules per gram ("J/g") or more, in some embodiments about 20 J/g or more, and in some embodiments about 30 J/g or more, and in some embodiments, about 40 J/g or more. Furthermore, the composition may also exhibit a width ($\Delta W1/2$) at the half height of the crystallization peak of about 20° C. or less, in some embodiments about 15° C. or less, and in some embodiments, about 10° C. or less. The latent heat of fusion ($\Delta H_f$), latent heat of crystallization ($\Delta H_c$), crystallization temperature, and width at the half height of the crystallization peak may all be determined as is well known in the art using differential scanning calorimetry ("DSC") in accordance with ASTM D-3417.

Due to the increase in the crystallization temperature, the temperature window between the glass transition temperature and crystallization temperature is also increased, which provides for greater processing flexibility by increasing the residence time for the material to crystallize. For example, the temperature window between the crystallization temperature and glass transition temperature of the thermoplastic composition may be about 50° C. or more apart, in some embodiments about 100° C. or more apart, and in some embodiments 150° C. or more apart.

III. Fiber Formation

Fibers formed from the thermoplastic composition may generally have any desired configuration, including monocomponent, multicomponent (e.g., sheath-core configuration, side-by-side configuration, segmented pie configuration, island-in-the-sea configuration, and so forth), and/or multiconstituent (e.g., polymer blend). In some embodiments, the fibers may contain one or more additional polymers as a component (e.g., bicomponent) or constituent (e.g., biconstituent) to further enhance strength and other mechanical properties. For instance, the thermoplastic composition may form a sheath component of a sheath/core bicomponent fiber, while an additional polymer may form the core component, or vice versa. The additional polymer may be a thermoplastic polymer, such as polyolefins, e.g., polyethylene, polypropylene, polybutylene, and so forth; polytetrafluoroethylene; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; and polyurethanes. Alternatively, the additional polymer may be biodegradable, such as aliphatic polyesters, such as polyesteramides, modified polyethylene terephthalate, polylactic acid (PLA) and its copolymers, terpolymers based on polylactic acid, polyglycolic acid, polyalkylene carbonates (such as polyethylene carbonate), polyhydroxyalkanoates (PHA), polyhydroxybutyrates (PHB), polyhydroxyvalerates (PHV), polyhydroxybutyrate-hydroxyvalerate copolymers (PHBV), and polycaprolactone, and succinate-based aliphatic polymers (e.g., polybutylene succinate, polybutylene succinate adipate, and polyethylene succinate); alipathic-aromatic copolyesters; etc.

Any of a variety of processes may be used to form fibers in accordance with the present invention. For example, the melt processed thermoplastic composition described above may be extruded through a spinneret, quenched, and drawn into the vertical passage of a fiber draw unit. The fibers may then be cut to form staple fibers having an average fiber length in the range of from about 3 to about 80 millimeters, in some embodiments from about 4 to about 65 millimeters, and in some embodiments, from about 5 to about 50 millimeters. The staple fibers may then be incorporated into a nonwoven web as is known in the art, such as bonded carded webs, through-air bonded webs, etc.

Figure 1:
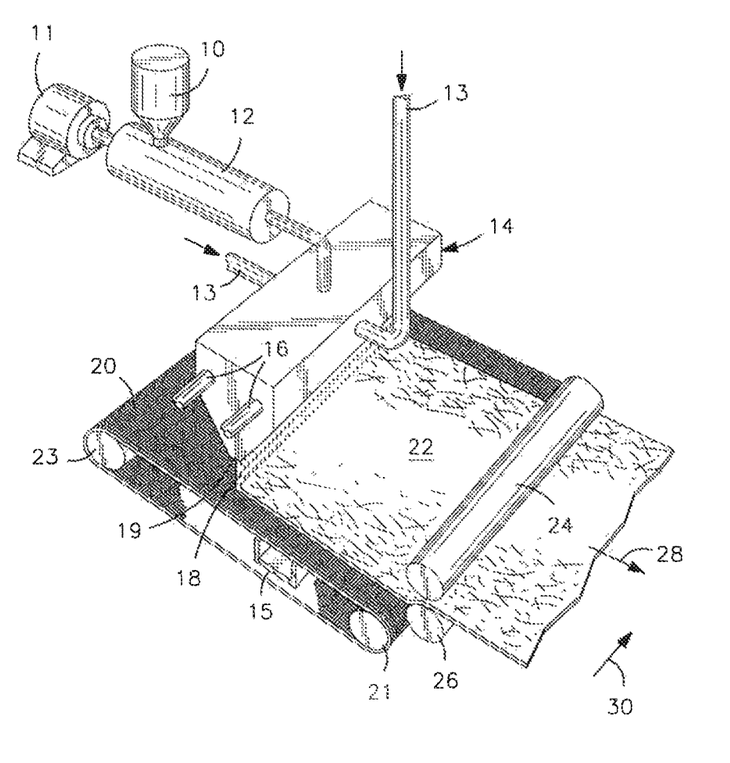
FIG. 1 is a schematic illustration of a process that may be used in one embodiment of the present invention to form a nonwoven web.

The fibers may also be deposited onto a foraminous surface to form a nonwoven web. Referring to FIG. 1, for example, one embodiment of a method for forming meltblown fibers is shown. Meltblown fibers form a structure having a small average pore size, which may be used to inhibit the passage of liquids and particles, while allowing gases (e.g., air and water vapor) to pass therethrough. To achieve the desired pore size, the meltblown fibers are typically "microfibers" in that they have an average size of 10 micrometers or less, in some embodiments about 7 micrometers or less, and in some embodiments, about 5 micrometers or less. The ability to produce such fine fibers may be facilitated in the present invention through the use of a thermoplastic composition having the desirable combination of low apparent viscosity and high melt flow rate.

In FIG. 1, for instance, the raw materials (e.g., aromatic polyester, polyether copolymer, etc.) are fed into an extruder 12 from a hopper 10. The raw materials may be provided to the hopper 10 using any conventional technique and in any state. The extruder 12 is driven by a motor 11 and heated to a temperature sufficient to extrude the melted polymer. For example, the extruder 12 may employ one or multiple zones operating at a temperature of from about 150° C. to about 350° C., in some embodiments from about 200° C. to about 300° C., and in some embodiments, from about 240° C. to about 290° C. If desired, the extruder may also possess one or more zones that remove excess moisture from the polymer, such as vacuum zones, etc. The extruder may also be vented to allow volatile gases to escape.

Once formed, the thermoplastic composition may be subsequently fed to another extruder in a fiber formation line. Alternatively, the thermoplastic composition may be directly formed into a fiber through supply to a die 14, which may be heated by a heater 16. It should be understood that other meltblown die tips may also be employed. As the polymer exits the die 14 at an orifice 19, high pressure fluid (e.g., heated air) supplied by conduits 13 attenuates and spreads the polymer stream into microfibers 18. Although not shown in FIG. 1, the die 14 may also be arranged adjacent to or near a chute through which other materials (e.g., cellulosic fibers, particles, etc.) traverse to intermix with the extruded polymer and form a "coform" web. The microfibers 18 are randomly deposited onto a foraminous surface 20 (driven by rolls 21 and 23) with the aid of an optional suction box 15 to form a meltblown web 22. The distance between the die tip and the foraminous surface 20 is generally small to improve the uniformity of the fiber laydown. For example, the distance may be from about 1 to about 35 centimeters, and in some embodiments, from about 2.5 to about 15 centimeters. In FIG. 1, the direction of the arrow 28 shows the direction in which the web is formed (i.e., "machine direction") and arrow 30 shows a direction perpendicular to the machine direction (i.e., "cross-machine direction"). Optionally, the meltblown web 22 may then be compressed by rolls 24 and 26. The desired denier of the fibers may vary depending on the desired application. Typically, the fibers are formed to have a denier per filament (i.e., the unit of linear density equal to the mass in grams per 9000 meters of fiber) of less than about 6, in some embodiments less than about 3, and in some embodiments, from about 0.5 to about 3. In addition, the fibers generally have an average diameter of from about 0.1 to about 20 micrometers, in some embodiments from about 0.5 to about 15 micrometers, and in some embodiments, from about 1 to about 10 micrometers.

Once formed, the nonwoven web may then be bonded using any conventional technique, such as with an adhesive or autogenously (e.g., fusion and/or self-adhesion of the fibers without an applied external adhesive). Autogenous bonding, for instance, may be achieved through contact of the fibers while they are semi-molten or tacky, or simply by blending a tackifying resin and/or solvent with the aromatic polyester used to form the fibers. Suitable autogenous bonding techniques may include ultrasonic bonding, thermal bonding, through-air bonding, calendar bonding, and so forth. For example, the web may be further bonded or embossed with a pattern by a thermo-mechanical process in which the web is passed between a heated smooth anvil roll and a heated pattern roll. The pattern roll may have any raised pattern which provides the desired web properties or appearance. Desirably, the pattern roll defines a raised pattern which defines a plurality of bond locations which define a bond area between about 2% and 30% of the total area of the roll. Exemplary bond patterns include, for instance, those described in U.S. Pat. No. 3,855,046 to Hansen et al., U.S. Pat. No. 5,620,779 to Levy et al., U.S. Pat. No. 5,962,112 to Haynes et al., U.S. Pat. No. 6,093,665 to Sayovitz et al., as well as U.S. Design Pat. Nos. 428,267 to Romano et al.; 390,708 to Brown; 418,305 to Zander, et al.; 384,508 to Zander, et al.; 384,819 to Zander, et al.; 358,035 to Zander, et al.; and 315,990 to Blenke, et al., all of which are incorporated herein in their entirety by reference thereto for all purposes. The pressure between the rolls may be from about 5 to about 2000 pounds per lineal inch. The pressure between the rolls and the temperature of the rolls is balanced to obtain desired web properties or appearance while maintaining cloth like properties. As is well known to those skilled in the art, the temperature and pressure required may vary depending upon many factors including but not limited to, pattern bond area, polymer properties, fiber properties and nonwoven properties.

In addition to meltblown webs, a variety of other nonwoven webs may also be formed from the thermoplastic composition in accordance with the present invention, such as spunbond webs, bonded carded webs, wet-laid webs, airlaid webs, coform webs, hydraulically entangled webs, etc. For example, the polymer may be extruded through a spinnerette, quenched and drawn into substantially continuous filaments, and randomly deposited onto a forming surface. Alternatively, the polymer may be formed into a carded web by placing bales of fibers formed from the thermoplastic composition into a picker that separates the fibers. Next, the fibers are sent through a combing or carding unit that further breaks apart and aligns the fibers in the machine direction so as to form a machine direction-oriented fibrous nonwoven web. Once formed, the nonwoven web is typically stabilized by one or more known bonding techniques.

If desired, the nonwoven web may also be a composite that contains a combination of the thermoplastic composition fibers and other types of fibers (e.g., staple fibers, filaments, etc). For example, additional synthetic fibers may be utilized, such as those formed from polyolefins, e.g., polyethylene, polypropylene, polybutylene, and so forth; polytetrafluoroethylene; polyesters, e.g., polyethylene terephthalate and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; polyurethanes; polylactic acid; etc. If desired, biodegradable polymers, such as poly(glycolic acid) (PGA), poly(lactic acid) (PLA), poly($\beta$-malic acid) (PMLA), poly($\epsilon$-caprolactone) (PCL), poly(p-dioxanone) (PDS), poly (butylene succinate) (PBS), and poly(3-hydroxybutyrate) (PHB), may also be employed. Some examples of known synthetic fibers include sheath-core bicomponent fibers available from KoSa Inc. of Charlotte, N.C. under the designations T-255 and T-256, both of which use a polyolefin sheath, or T-254, which has a low melt co-polyester sheath. Still other known bicomponent fibers that may be used include those available from the Chisso Corporation of Moriyama, Japan or Fibervisions LLC of Wilmington, Del. Polylactic acid staple fibers may also be employed, such as those commercially available from Far Eastern Textile, Ltd. of Taiwan.

The composite may also contain pulp fibers, such as high-average fiber length pulp, low-average fiber length pulp, or mixtures thereof. One example of suitable high-average length fluff pulp fibers includes softwood kraft pulp fibers. Softwood kraft pulp fibers are derived from coniferous trees and include pulp fibers such as, but not limited to, northern, western, and southern softwood species, including redwood, red cedar, hemlock, Douglas fir, true firs, pine (e.g., southern pines), spruce (e.g., black spruce), bamboo, combinations thereof, and so forth. Northern softwood kraft pulp fibers may be used in the present invention. An example of commercially available southern softwood kraft pulp fibers suitable for use in the present invention include those available from Weyerhaeuser Company with offices in Federal Way, Washington under the trade designation of "NF-405." Another suitable pulp for use in the present invention is a bleached, sulfate wood pulp containing primarily softwood fibers that is available from Bowater Corp. with offices in Greenville, S.C. under the trade name CoosAbsorb S pulp. Low-average length fibers may also be used in the present invention. An example of suitable low-average length pulp fibers is hardwood kraft pulp fibers. Hardwood kraft pulp fibers are derived from deciduous trees and include pulp fibers such as, but not limited to, eucalyptus, maple, birch, aspen, etc. Eucalyptus kraft pulp fibers may be particularly desired to increase softness, enhance brightness, increase opacity, and change the pore structure of the sheet to increase its wicking ability. Bamboo fibers may also be employed.

Nonwoven composites may be formed using a variety of known techniques. For example, the nonwoven composite may be a "coform material" that contains a mixture or stabilized matrix of the thermoplastic composition fibers and an absorbent material. As an example, coform materials may be made by a process in which at least one meltblown die head is arranged near a chute through which the absorbent materials are added to the web while it is forming. Such absorbent materials may include, but are not limited to, pulp fibers, superabsorbent particles, inorganic and/or organic absorbent materials, treated polymeric staple fibers, and so forth. The relative percentages of the absorbent material may vary over a wide range depending on the desired characteristics of the nonwoven composite. For example, the nonwoven composite may contain from about 1 wt. % to about 60 wt. %, in some embodiments from 5 wt. % to about 50 wt. %, and in some embodiments, from about 10 wt. % to about 40 wt. % thermoplastic composition fibers. The nonwoven composite may likewise contain from about 40 wt. % to about 99 wt. %, in some embodiments from 50 wt. % to about 95 wt. %, and in some embodiments, from about 60 wt. % to about 90 wt. % absorbent material. Some examples of such coform materials are disclosed in U.S. Pat. No. 4,100,324 to Anderson, et al.; U.S. Pat. No. 5,284,703 to Everhart, et al.; and U.S. Pat. No. 5,350,624 to George, et al.; which are incorporated herein in their entirety by reference thereto for all purposes.

Nonwoven laminates may also be formed in the present invention in which one or more layers are formed from the thermoplastic composition. For example, the nonwoven web of one layer may be a meltblown or coform web that contains the thermoplastic composition, while the nonwoven web of another layer contains thermoplastic composition, other biodegradable polymer(s), and/or any other polymer (e.g., polyolefins). In one embodiment, the nonwoven laminate contains a meltblown layer positioned between two spunbond layers to form a spunbond/meltblown/spunbond ("SMS") laminate. If desired, the meltblown layer may be formed from the thermoplastic composition. The spunbond layer may be formed from the thermoplastic composition, other biodegradable polymer(s), and/or any other polymer (e.g., polyolefins). Various techniques for forming SMS laminates are described in U.S. Pat. No. 4,041,203 to Brock et al.; U.S. Pat. No. 5,213,881 to Timmons, et al.; U.S. Pat. No. 5,464,688 to Timmons, et al.; U.S. Pat. No. 4,374,888 to Bornslaeger; U.S. Pat. No. 5,169,706 to Collier, et al.; and U.S. Pat. No. 4,766,029 to Brock et al., as well as U.S. Patent Application Publication No. 2004/0002273 to Fitting, et al., all of which are incorporated herein in their entirety by reference thereto for all purposes. Of course, the nonwoven laminate may have other configuration and possess any desired number of meltblown and spunbond layers, such as spunbond/meltblown/meltblown/spunbond laminates ("SMMS"), spunbond/meltblown laminates ("SM"), etc. Although the basis weight of the nonwoven laminate may be tailored to the desired application, it generally ranges from about 10 to about 300 grams per square meter ("gsm"), in some embodiments from about 25 to about 200 gsm, and in some embodiments, from about 40 to about 150 gsm.

If desired, the nonwoven web or laminate may be applied with various treatments to impart desirable characteristics. For example, the web may be treated with liquid-repellency additives, antistatic agents, surfactants, colorants, antifogging agents, fluorochemical blood or alcohol repellents, lubricants, and/or antimicrobial agents. In addition, the web may be subjected to an electret treatment that imparts an electrostatic charge to improve filtration efficiency. The charge may include layers of positive or negative charges trapped at or near the surface of the polymer, or charge clouds stored in the bulk of the polymer. The charge may also include polarization charges that are frozen in alignment of the dipoles of the molecules. Techniques for subjecting a fabric to an electret treatment are well known by those skilled in the art. Examples of such techniques include, but are not limited to, thermal, liquid-contact, electron beam and corona discharge techniques. In one particular embodiment, the electret treatment is a corona discharge technique, which involves subjecting the laminate to a pair of electrical fields that have opposite polarities. Other methods for forming an electret material are described in U.S. Pat. No. 4,215,682 to Kubik, et al.; U.S. Pat. No. 4,375,718 to Wadsworth; U.S. Pat. No. 4,592,815 to Nakao; U.S. Pat. No. 4,874,659 to Ando; U.S. Pat. No. 5,401,446 to Tsai, et al.; U.S. Pat. No. 5,883,026 to Reader, et al.; U.S. Pat. No. 5,908,598 to Rousseau, et al.; U.S. Pat. No. 6,365,088 to Knight, et al., which are incorporated herein in their entirety by reference thereto for all purposes.

IV. Articles

The fibers and/or nonwoven web may be used in a wide variety of applications. For example, the web may be incorporated into a "medical product", such as gowns, surgical drapes, facemasks, head coverings, surgical caps, shoe coverings, sterilization wraps, warming blankets, heating pads, and so forth. Of course, the nonwoven web may also be used in various other articles. For example, the nonwoven web may be incorporated into an "absorbent article" that is capable of absorbing water or other fluids. Examples of some absorbent articles include, but are not limited to, personal care absorbent articles, such as diapers, training pants, absorbent underpants, incontinence articles, feminine hygiene products (e.g., sanitary napkins), swim wear, baby wipes, mitt wipe, and so forth; medical absorbent articles, such as garments, fenestration materials, underpads, bedpads, bandages, absorbent drapes, and medical wipes; food service wipers; clothing articles; pouches, and so forth. Materials and processes suitable for forming such articles are well known to those skilled in the art. Absorbent articles, for instance, typically include a substantially liquid-impermeable layer (e.g., outer cover), a liquid-permeable layer (e.g., bodyside liner, surge layer, etc.), and an absorbent core. In one embodiment, for example, a nonwoven web formed according to the present invention may be used to form an outer cover of an absorbent article. If desired, the nonwoven web may be laminated to a liquid-impermeable film that is either vapor-permeable or vapor-impermeable.

The present invention may be better understood with reference to the following examples.

Test Methods

Water Content:

Water content was determined using an Arizona Instruments Computrac Vapor Pro moisture analyzer (Model No. 3100) in substantial accordance with ASTM D 7191-05, which is incorporated herein in its entirety by reference thereto for all purposes. The test temperature (§X2.1.2) was 130° C., the sample size (§X2.1.1) was 2 to 4 grams, and the vial purge time (§X2.1.4) was 30 seconds. Further, the ending criteria (§X2.1.3) was defined as a "prediction" mode, which means that the test is ended when the built-in programmed criteria (which mathematically calculates the end point moisture content) is satisfied.

Melt Flow Index:

The melt flow index is the weight of a polymer (in grams) forced through an extrusion rheometer orifice (0.0825-inch diameter) when subjected to a load of 2160 grams in 10 minutes, typically at 270° C. Unless otherwise indicated, the melt flow index was measured in accordance with ASTM Test Method D1239. Prior to testing, all resin samples were dried overnight at a temperature of 170° F. to a moisture content of about 50 ppm or less. The fiber samples were not dried prior to testing.

Thermal Properties:

The melting temperature, glass transition temperature and degree of crystallinity of a material were determined by differential scanning calorimetry (DSC). The differential scanning calorimeter was a DSC Q100 Differential Scanning calorimeter, which was outfitted with a liquid nitrogen cooling accessory and with a UNIVERSAL ANALYSIS 2000 (version 4.6.6) analysis software program, both of which are available from T.A. Instruments Inc. of New Castle, Del. Prior to testing, all resin samples were dried overnight at a temperature of 170° F. to a moisture content of about 50 ppm or less. To avoid directly handling the samples, tweezers or other tools were used after the resins were dried. The samples were placed into an aluminum pan and weighed to an accuracy of 0.01 milligram on an analytical balance. A lid was crimped over the material sample onto the pan. Typically, the resin pellets were placed directly in the weighing pan, and the fibers were cut to accommodate placement on the weighing pan and covering by the lid.

The differential scanning calorimeter was calibrated using an indium metal standard and a baseline correction was performed, as described in the operating manual for the differential scanning calorimeter. A material sample was placed into the test chamber of the differential scanning calorimeter for testing, and an empty pan is used as a reference. All testing was run with a 55-cubic centimeter per minute nitrogen (industrial grade) purge on the test chamber. For resin pellet samples, the heating and cooling program was a 2-cycle test that began with an equilibration of the chamber to −25° C., followed by a first heating period at a heating rate of 10° C. per minute to a temperature of 300° C., followed by equilibration of the sample at 300° C. for 2 minutes, followed by a first cooling period at a cooling rate of 10° C. per minute to a temperature of −25° C., followed by equilibration of the sample at −25° C. for 2 minutes, and then a second heating period at a heating rate of 10° C. per minute to a temperature of 300° C. For fiber samples, the heating and cooling program was a 1-cycle test that began with an equilibration of the chamber to −25° C., followed by a heating period at a heating rate of 10° C. per minute to a temperature of 300° C., followed by equilibration of the sample at 300° C. for 2 minutes, and then a cooling period at a cooling rate of 10° C. per minute to a temperature of −25° C. All testing was run with a 55-cubic centimeter per minute nitrogen (industrial grade) purge on the test chamber.

The results were then evaluated using the UNIVERSAL ANALYSIS 2000 analysis software program, which identified and quantified the glass transition temperature ($T_g$) of inflection, the endothermic and exothermic peaks, and the areas under the peaks on the DSC plots. The glass transition temperature was identified as the region on the plot-line where a distinct change in slope occurred, and the melting temperature was determined using an automatic inflection calculation. The areas under the peaks on the DSC plots were determined in terms of joules per gram of sample (J/g). For example, the heat of fusion of a resin or fiber sample was determined by integrating the area of the endothermic peak. The area values were determined by converting the areas under the DSC plots (e.g., the area of the endotherm) into the units of joules per gram (J/g) using computer software. The exothermic heat of crystallization (ΔH) was determined during the first cooling cycle. In certain cases, the exothermic heat of crystallization was also determined during the first heating cycle (ΔH$_{c1}$) and the second cycle (ΔH$_{c2}$). If desired, the areas under any exothermic peaks encountered in the DSC scan due to insufficient crystallinity may also be subtracted from the area under the endothermic peak to approximately represent the degree of crystallinity.

Tensile Properties:

The strip tensile strength values were determined in substantial accordance with ASTM Standard D-5034. Specifically, a nonwoven web sample was cut or otherwise provided with size dimensions that measured 25.4 millimeters (width)×152.4 millimeters (length). A constant-rate-of-extension type of tensile tester was employed. The tensile testing system was a Sintech Tensile Tester, which is available from Sintech Corp. of Cary, N.C., The tensile tester was equipped with TESTWORKS 4.08B software from MTS Corporation to support the testing. An appropriate load cell was selected so that the tested value fell within the range of 10-90% of the full scale load. The sample was held between grips having a front and back face measuring 25.4 millimeters×76 millimeters. The grip faces were rubberized, and the longer dimension of the grip was perpendicular to the direction of pull. The grip pressure was pneumatically maintained at a pressure of 40 pounds per square inch. The tensile test was run at a 300-millimeter per minute rate with a gauge length of 10.16 centimeters and a break sensitivity of 40%.

Three samples were tested by applying the test load along the machine-direction ("MD") and three samples were tested by applying the test load along the cross direction ("CD"). In addition to tensile strength ("peak load"), the peak elongation (i.e., % strain at peak load) was also measured.

EXAMPLE 1

The ability to modify virgin polyethylene terephthalate ("PET") (CRYSTAR® 4434 from DuPont, which is obtained from the reaction of dimethyl terephthalate and ethylene glycol) with a PEG-PPG-PEG block copolymer (PLURONIC® F-68, BASF) was demonstrated. Prior to use, the CRYSTAR® 4434 resin was pre-dried at a temperature of 170° F. overnight to a moisture content of 50 ppm or less. A co-rotating, twin-screw extruder (ZSK-30, diameter of 30 mm, length of 1328 millimeters) was employed that was manufactured by Werner and Pfleiderer Corporation of Ramsey, N.J. The extruder possessed 14 zones, numbered consecutively 1-14 from the feed hopper to the die. The first barrel #1 received the CRYSTAR® 4434 and PLURONIC® F-68 resins via volumetric feeder at a total throughput of 15-30 pounds per hour. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The reactive extrusion conditions are shown below in Table 1.

The melt flow index of the resulting thermoplastic blend was determined as described above to be 240 g/10 min (270° C., 2.16 kg). This value is significantly greater than the melt flow index of the virgin CRYSTAR® 4434 resin—i.e., 48 g/10 min (270° C., 2.16 kg) at a moisture level of 44 ppm.

EXAMPLE 2

Samples of the thermoplastic blends of Example 1 were initially dried at 150° F. for 24 hours. Meltblown webs were then formed from the resin samples on a conventional meltblown equipment. During processing, samples were collected as webs of monocomponent fibers under different primary air pressure conditions. A control meltblown web was also formed that contained monocomponent fibers of polypropylene (PF015, Basell North America, Inc. of Elkton, Md.). The conditions for forming the meltblown webs are set forth below in Table 2.

TABLE 2

Meltblown Web Processing Conditions

| Sample | Control | A | B | C | D | E |
|---|---|---|---|---|---|---|
| Polymer Type | PP 015 | PET/F68 | PET/F68 | PET/F68 | PET/F68 | PET/F68 |
| Weight (gsm) | 17 | 26 | 26 | 26 | 26 | 26 |
| Normalized Throughput (lb/in/hour/die tip) | 1 | 1 | 1 | 1 | 1 | 1 |
| Extruder Barrel Temperature, ° F. | 480 | 540 | 540 | 540 | 540 | 540 |
| Auxiliary Hose Temp, ° F. | 480 | 540 | 540 | 540 | 540 | 540 |
| Die Tip Primary Air Temp, ° F. | 470 | 560 | 560 | 560 | 560 | 560 |
| Die Tip Attenuation Air Pressure (psi) | 4 | 10 | 8 | 6 | 4 | 2 |

Once formed, various thermal and mechanical properties of the webs are set forth below in Table 3 and 4, respectively.

TABLE 3

Meltblown Web Thermal Properties
Thermo properties of MB webs from modified PET by DSC

| | 1st Heat | | | | 1st Cool | | |
|---|---|---|---|---|---|---|---|
| Samples Webs | Tg (° C.) | Tm (° C.) | ΔHc (J/g) | ΔHf (J/g) | ΔHc (J/g) | Tc | ΔW1/2 |
| A | 46 | 256 | 10.6 | 51.9 | 45.2 | 222.6 | 7.7 |
| B | 46.3 | 257.2 | 12.7 | 46 | 39 | 217.7 | 7.5 |
| C | 45.6 | 256.7 | 14.4 | 45.6 | 40.3 | 218.2 | 7.5 |
| D | N/A | 256.4 | 14.9 | 46.1 | 41 | 217.1 | 9 |
| E | N/A | 256.2 | 17.4 | 43.8 | 38.5 | 216.7 | 8 |

TABLE 1

Compounding conditions for PET modification with polyether copolymers

| Samples | PET 4434 | F68 | Throughput | Speed | Zone 1 | Zone 2 | Zone 3 | Zone 4 | Zone 5 | Zone 6 | Zone 7 | Tmelt | Pmelt | Torque |
|---|---|---|---|---|---|---|---|---|---|---|---|---|---|---|
| No 3 | 94.00% | 6.00% | 25 lb/h | 400 rpm | 70 | 225 | 270 | 270 | 265 | 260 | 250 | 250 | 105 Psi | 68-74% |

TABLE 4

Mechanical properties of Meltblown Webs

| Samples | | Peak Load (gf) | % Strain at Break |
|---|---|---|---|
| A | MD | 717 ± 104 | 6 ± 0.8 |
|   | CD | 323 ± 40  | 7 ± 1 |
| B | MD | 790 ± 107 | 6.7 ± 0.6 |
|   | CD | 264 ± 29  | 9.7 ± 2.5 |
| C | MD | 654 ± 80  | 5.6 ± 0.6 |
|   | CD | 187 ± 10  | 8.9 ± 1.8 |
| D | MD | 611 ± 59  | 4.8 ± 0.5 |
|   | CD | 108 ± 2.7 | 17.3 ± 4.7 |
| E | MD | 445 ± 60  | 4.2 ± 0.8 |
|   | CD | 54 ± 3.8  | 22 ± 4.1 |

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A fiber for use in forming a nonwoven web, the fiber being formed from a thermoplastic composition comprising at least one aromatic polyester in an amount from about 75 wt. % to about 99 wt. % and at least one polyether copolymer in an amount from about 1 wt. % to about 25 wt %, wherein the polyether copolymer contains from about 40 mol.% to about 95 mol.% of a repeating unit (A) having the following formula:

(A)

wherein,
x is an integer from 1 to 250,
the polyether copolymer further containing from about 5 mol.% to about 60 mol.% of a repeating unit (B) having the following formula:

(B)

wherein,
n is an integer from 3 to 20; and
y is an integer from 1 to 150,
wherein the polyether copolymer has the following general structure;

wherein
z is an integer from 0 to 200;
A is hydrogen, an alkyl group, an acyl group, or an aryl group of 1 to 10 carbon atoms, and
B is hydrogen, an alkyl group, an acyl group, or an aryl group of 1 to 10 carbon atoms.

2. The fiber of claim 1, wherein the carboxylic acid constituent is obtained from terephthalic acid, isophthalic acid, napthalic acid, derivatives thereof, or combinations of the foregoing.

3. The fiber of claim 1, wherein the aromatic polyester includes poly(ethylene terephthalate), poly(propylene terephthalate), poly(butylene terephthlate), derivatives thereof, or a mixture of the foregoing.

4. The fiber of claim 1, wherein n is an integer from 3 to 6.

5. The fiber of claim 1, wherein the repeating unit (B) is derived from 1,2-propanediol.

6. The fiber of claim 1, wherein A is hydrogen, B is hydrogen, and z is an integer from 2 to 125.

7. The fiber of claim 1, wherein the thermoplastic composition has a glass transition temperature of about 5° C. to about 70° C.

8. The fiber of claim 1, wherein the thermoplastic composition has a melting temperature of from about 150° C. to about 350° C.

9. The fiber of claim 1, wherein the thermoplastic composition has a melt flow index of from about 100 to about 800 grams per 10 minutes, determined at a load of 2160 grams and temperature of 270° C. in accordance with ASTM Test Method D1239.

10. A nonwoven web comprising the fiber of claim 1.

11. The nonwoven web of claim 10, wherein the web is a meltblown web, coform web, spunbond web, or a combination thereof.

12. An absorbent article comprising the nonwoven web of claim 11.

* * * * *